United States Patent [19]

Nielsen

[11] Patent Number: 5,609,019
[45] Date of Patent: Mar. 11, 1997

[54] APPARATUS FOR OPERATING A GAS TURBINE IN A SIMPLE CYCLE AND IN A CYCLE COMBINED WITH A STEAM TURBINE

[75] Inventor: Henrik Nielsen, Wettlngen, Switzerland

[73] Assignee: ABB Management AG, Baden, Switzerland

[21] Appl. No.: 546,717

[22] Filed: Oct. 23, 1995

Related U.S. Application Data

[62] Division of Ser. No. 358,563, Dec. 14, 1994, Pat. No. 5,493,854.

[30] Foreign Application Priority Data

Dec. 29, 1993 [DE] Germany ................ 43 44 857.7

[51] Int. Cl.⁶ .................................................. F02C 6/18
[52] U.S. Cl. ................................................ 60/39.182
[58] Field of Search ................... 60/39.02, 39.182, 60/39.83, 728; 122/2 R, 2 B

[56] References Cited

U.S. PATENT DOCUMENTS 4,424,668 1/1984 Mukerjee ................ 60/39.182
4,821,507 4/1989 Bachmann et al. ........... 60/39.182

FOREIGN PATENT DOCUMENTS 519304 12/1992 European Pat. Off..

*Primary Examiner*—Louis J. Casaregola
*Attorney, Agent, or Firm*—Burns, Doane, Swecker & Mathis

[57] ABSTRACT

A gas turbine apparatus that can be operated selectively in a simple cycle or in a combined steam turbine cycle increases the efficiency of the installation and provides easy switch-over from the simple cycle to the combined cycle, and at the same time provides for cooling the cooling air for the gas turbine. The gas turbine and waste-heat boiler are connected by a transition piece. A heat exchanger for cooling the cooling air is disposed in a duct connected to the transition piece for introducing a gaseous medium for mixing with the gas turbine exhaust. The gaseous medium cools the cooling air and is accordingly heated. The heated gaseous medium is mixed with the exhaust gas of the turbine, and the mixture directed to the waste heat boiler to generate steam for the steam turbine for operating in the combined cycle. A simply operated duct selectively directs the flow of the mixture. A chimney with a closing flap is positioned on the transition piece between the cooling duct and the waste-heat boiler to selectively direct the mixed gases to the waste-heat boiler or the environment.

3 Claims, 1 Drawing Sheet

APPARATUS FOR OPERATING A GAS TURBINE IN A SIMPLE CYCLE AND IN A CYCLE COMBINED WITH A STEAM TURBINE

This application is a divisional of application Ser. No. 08/358,563, filed Dec. 14, 1994 (U.S. Pat. No. 5,493,854).

FIELD OF THE INVENTION

The invention relates to a method and an appliance for operating a gas turbine in a simple cycle and in a cycle combined with a steam turbine.

BACKGROUND

Gas turbines have recently been increasingly combined with steam turbines to form combined gas/steam turbine power stations, so called combined power stations. In these power stations, the exhaust gases of the gas turbine circuit supply the energy for the downstream steam turbine circuit.

For this purpose, heat exchangers are arranged in the waste-heat boiler of the gas turbine and these heat exchangers extract the major part of the heat available in them from the exhaust gases of the gas turbine before the latter are delivered to the atmosphere through a chimney. Using this heat, water which has been supplied is evaporated in a multi-stage water/steam circuit and live steam is obtained. The latter is supplied to the steam turbine and is admitted to its blading rows so that the thermal energy is converted into mechanical energy. The steam turbine is coupled to a generator which produces electrical energy.

A relatively high utilization of the fuel is possible in this way and relatively high efficiencies can be achieved.

However, even in such combined power stations, part of the available heat energy is not used and is delivered to the ambient air as waste heat. Such energy losses must, however, be minimized if the efficiency of the power station is to be increased.

A combined power station is known from EP 05 19 304 A1 in which the energy of the cooling air, which is heated in the compressor and is provided for the gas turbine, is not delivered as waste heat to the external air but is used for converting an additional liquid medium into steam. A separate, second cooling system provided with integrated heat exchangers has to be configured for this purpose. It initially carries cooling water which is converted into steam when flowing through the heat exchangers and the steam is finally fed into the combustion chamber of the gas turbine. The separate cooling system can also feed the steam into the water/steam circuit of the waste-heat boiler, for which purpose the two are connected together.

Such a separate cooling system is found to be problematic where the combined cycle installation, i.e. the joint operation of the gas turbine and the steam turbine, has to be converted to the simple cycle, i.e. to the operation of the gas turbine alone. In this case, the exhaust gases from the gas turbine are no longer fed into the heat exchangers of the waste-heat boiler but are fed directly to the chimney. The water/steam circuit taking place in the waste-heat boiler is therefore made inactive and the supply of cooling water is stopped. So that the additional liquid medium, or the steam, of the second cooling system can then no longer penetrate into the heat exchangers, their connection must be interrupted and the connection to the combustion chamber or another consumer unit opened.

This requires complicated, mutually matched switching procedures and reduces the reliability of the system.

In order to arrange such a separate cooling system, a series of additional components, such as pumps, pipes and heat exchangers is necessary and these make the installation not only more complicated but also more expensive.

In the case of a leakage in the combined air/water cooling system, furthermore, the danger exists that cooling water may penetrate into the gas turbine and there lead to damage. At the very least, however, the effect of the openings in the rotor blades provided for the purpose of air cooling can be impaired by the impurities and minerals contained in the cooling water and this greatly endangers the functional capability of the gas turbine.

SUMMARY OF THE INVENTION

Accordingly, the invention attempts to avoid all these disadvantages and one of its objects is to provide a simple, functionally reliable and low-cost method of operating a gas turbine in a simple cycle and in a cycle combined with a steam turbine, while increasing the efficiency and providing unproblematic switch-over from the simple cycle to the combined cycle, and vice versa, and to create an appliance for carrying out the method.

According to the invention, this is achieved in that, in a method for operating a combined gas/steam installation and to cool the cooling air, a gaseous medium is fed via a cooler into the waste-heat boiler. The gaseous medium is then heated in the cooler by heat exchange with the cooling air of the gas turbine to near the temperature of the cooling air and is subsequently mixed into the exhaust gas from the gas turbine. The resulting mixture of exhaust gas and hot gas is supplied to the water/steam circuit in the combined cycle and is released to the environment by means of a by-pass chimney in the simple cycle.

For this purpose, the exhaust gas end of the gas turbine is connected to the waste-heat boiler by a transition piece. A by-pass chimney provided with a closing flap is arranged on the waste-heat boiler in the region of the transition piece and a cooler with an integrated heat exchanger is arranged upstream of the by-pass chimney. Both the gas turbine and the cooler open into a common mixing zone in the region of the transition piece. A supply conduit and an extraction conduit for the cooling air of the gas turbine act on the heat exchanger.

The advantages of the invention lie, inter alia, in the fact that the second cooling system does not have to be separately arranged and connected but is directly integrated in the waste-heat boiler. This removes the problems associated with the previously necessary separate cooling system when switching over from combined operation of the gas turbine and steam turbine to simple operation of the gas turbine and vice versa.

If the closing flap of the by-pass chimney is opened or closed when switching the installation over, therefore, the mixture of exhaust gas and hot gas is correspondingly delivered either via the by-pass chimney to the environment or to the waste-heat boiler, i.e. to the water/steam circuit. In this way, there is an automatic change of the installation to suit the current type of operation, i.e. without additional cooling system switching procedures which have to be mutually matched. The power of the steam turbine is increased because of the direct and additional feed of the waste heat from the cooling air into the waste-heat boiler.

Impairment to the functional capability of the gas turbine because of the penetration of cooling water is excluded from the outset because it is not water but a gaseous medium, i.e. a medium with a lower pressure than the heat exchange medium, which is employed for the cooling air.

Ambient air or combustion gas are advantageously used as the gaseous medium because both material mixtures are relatively easily available.

It is particularly expedient if, in the cooler, the ambient air, which is employed for cooling the cooling air of the gas turbine first of all meets a further waste-heat medium of the combined power station, this medium having a lower temperature level than the cooling air. The ambient air is preheated by this means and is only then heated by heat exchange with the cooling air of the gas turbine to a temperature near that of the cooling air. The energy of the combustion gas from an appropriate location in the waste-heat boiler is preferably used as the further waste-heat medium. For this purpose, a second supply conduit and extraction conduit for the waste-heat medium extends in the cooler before the supply conduit and the extraction conduit for the cooling air of the gas turbine, viewed in the flow direction of the gaseous medium.

Because of the preheating of the ambient air by means of a further waste-heat medium with a lower temperature level than the cooling air, a better efficiency is attained due to the utilization of previous waste-heat energy, on the one hand, and a more even rise of temperature is achieved in the cooler, on the other, thus increasing its life.

In addition to this, there are further possibilities for cooling the gas turbine cooling air—specifically by means of the available, but not preheated, ambient air or by means of the combustion gas from the waste-heat boiler.

In the case of a power station utilized exclusively in combined operation, the individual components are arranged in an analogous manner but no by-pass chimney is necessary.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, which represent an embodiment example of the invention using a waste-heat boiler connected to the gas turbine and wherein.

DESCRIPTION OF THE PREFERRED EMBODIMENTS

Figure 1:
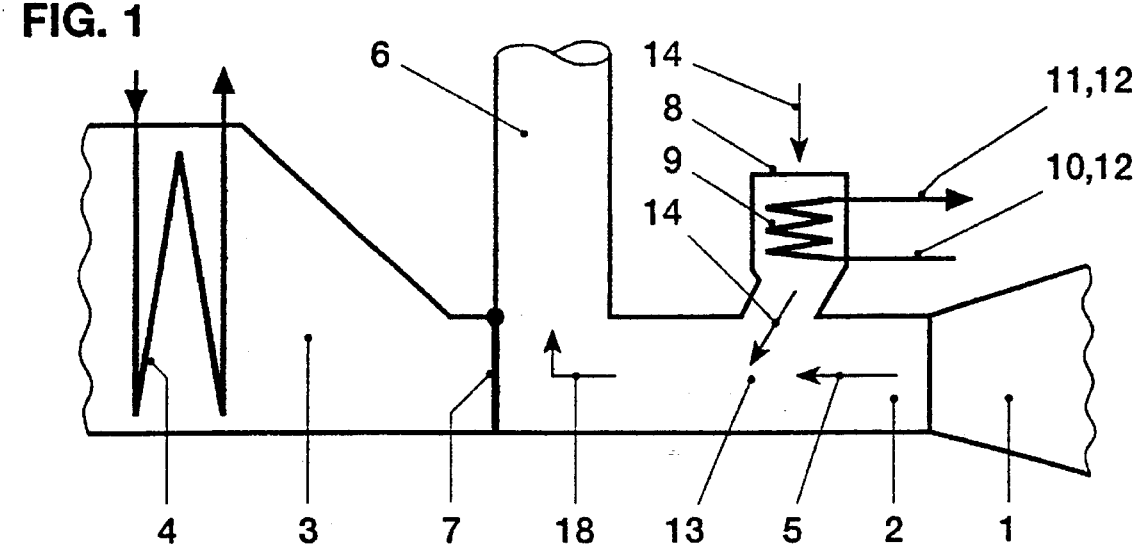
FIG. 1 shows a partial longitudinal section of the installation when operated as a simple cycle.

Referring now to the drawings, wherein only the elements essential to understanding the invention are shown (not shown, for example, are the compressor of the gas turbine and the steam turbine of the installation), where the flow directions of the working media are indicated by arrows and wherein like reference numerals designate identical or corresponding parts throughout the several views, the gas turbine 1 is connected to the waste-heat boiler 3 by means of a transition piece 2. A water/steam circuit 4 is arranged in the waste-heat boiler 3 and extracts the major part of the heat still present from the exhaust gases 5 of the gas turbine 1 so as to generate live steam and feed the steam turbine with the latter. A by-pass chimney 6 is arranged on the waste-heat boiler 3 in the region of the transition piece 2. This by-pass chimney 6 is provided with a closing flap 7 which, in the open condition, closes the transition piece 2 against the waste-heat boiler 3. In the combined cycle, however, the chimney itself is closed. A cooler 8 with an integrated heat exchanger 9 is likewise arranged on the transition piece 2 before the by-pass chimney 6, viewed in the flow direction. A supply conduit and an extraction conduit 10, 11 for the cooling air 12 of the gas turbine 1 acts on the heat exchanger 9. The cooler 8 and the gas turbine 1 open into the same region of the transition piece 2 so that a mixing zone 13 is configured there (FIG. 1).

Figure 2:
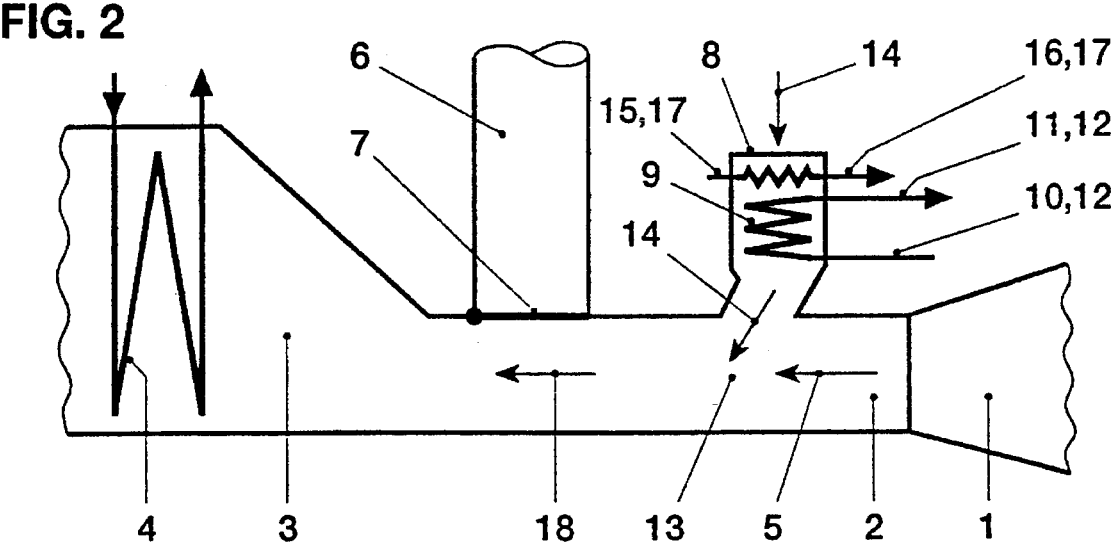
FIG. 2 shows a partial longitudinal section of the installation when operated as a combined cycle, with preheating of the cooling air.

In order to cool the cooling air 12, ambient air is fed as the gaseous medium 14 via the cooler 8 into the waste-heat boiler 3. The ambient air 14 is heated by heat exchange with the cooling air 12 of the gas turbine 1 to near the temperature of the cooling air. A second supply conduit and extraction conduit 15, 16 for the combustion gas of the waste-heat boiler 3, which is used as a further waste-heat medium 17 of the combined power station, extends (viewed in the flow direction of the ambient air 14) in the cooler 8 before the supply conduit and the extraction conduit 10, 11 for the cooling air 12 of the gas turbine 1 (FIG. 2). Because the temperature level of the combustion gas 17 is lower than that of the cooling air 12 of the gas turbine 1 but higher than that of the ambient air 14, preheating of the ambient air 14 takes place first and, therefore, even heating of this ambient air 14 and, in consequence, of the cooler 8 also.

Further possibilities for reducing the temperature of the cooling air 12 follow from the use of non-preheated ambient air or also of combustion gas from the waste-heat boiler as the gaseous medium 14.

The heated ambient air 14 is subsequently introduced into the exhaust gas 5 of the gas turbine 1 and mixed with the latter in the mixing zone 13. The resulting mixture of exhaust gas and hot gas mixture 18 is introduced into the water/steam circuit 4 and there effects an increased generation of steam for the steam turbine.

If the gas turbine 1 is to be operated alone, i.e. without the steam turbine, the closing flap 7 is opened and, therefore, the transition piece 2 is closed off from the waste-heat boiler 3 so that the mixture of exhaust gas and hot gas 18 is delivered to the surroundings via the by-pass chimney 6. The change of the installation from a combined cycle to a simple cycle takes place in this way—and also, by renewed closing of the closing flap 7, vice versa—without additional cooling system switching procedures which have to be mutually matched.

Figure 3:
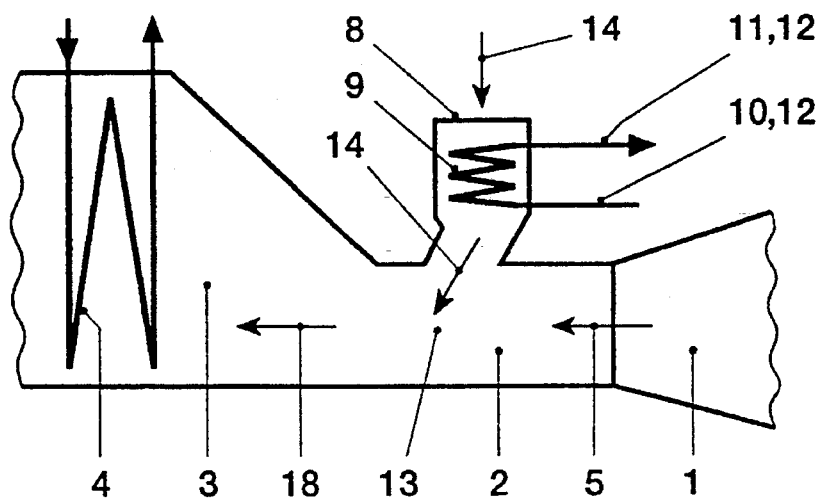
FIG. 3 shows a partial longitudinal section corresponding to FIG. 1, without by-pass chimney.

If the installation is to be exclusively operated in the combined cycle, no by-pass chimney 6 is provided. The cooler can then be arranged either before the waste-heat boiler 3 or, for thermodynamic reasons, on the waste-heat boiler 3. If the latter is the case, the admixture of the heated ambient air 14 takes place between the individual tube bundles (not represented) of the waste-heat boiler 3. All the other components are optionally arranged, in a manner analogous to that in the installation already described which is operated in a simple or combined cycle, and function correspondingly (FIG. 3).

Obviously, numerous modifications and variations of the present invention are possible in light of the above teachings. It is therefore to be understood that within the scope of the appended claims, the invention may be practiced otherwise than as specifically described herein.

What is claimed is:

1. A gas turbine operable in a cycle combined with a steam turbine, comprising:
   a gas turbine;
   a waste-heat boiler;
   a transition piece connected to direct exhaust gas of the gas turbine to the waste-heat boiler;
   a cooler with an integrated heat exchanger connected to the transition piece between the gas turbine and the waste-heat boiler, the cooler connect to receive a flow of one of ambient air and a waste heat medium of the waste heat boiler, wherein both the gas turbine and the cooler open into a common mixing zone in the transition piece for mixing the exhaust gas of the gas turbine and the flow from the cooler; and
   a supply conduit and an extraction conduit to circulate cooling air for the gas turbine to the heat exchanger and direct the cooling air to the gas turbine.

2. The apparatus as claimed in claim 1, wherein the cooler is connected to receive ambient air, the apparatus further comprising a second heat exchanger disposed in the cooler including a second supply conduit and extraction conduit connected to circulate a waste-heat medium from the waste heat boiler to the cooler, the second supply conduit and extraction conduit extending into the cooler upstream of the supply conduit and the extraction conduit for the cooling air of the gas turbine viewed in a flow direction of the cooler.

3. The apparatus as claimed in claim 1, further comprising a by-pass chimney connected to the transition piece between the waste-heat boiler and the cooler, the by-pass chimney having a closing flap to selectively close one of the chimney and the waste-heat boiler from the transition piece.

* * * * *